(12) United States Patent
Watson et al.

(10) Patent No.: US 8,894,784 B2
(45) Date of Patent: Nov. 25, 2014

(54) METHOD OF PROCESSING A COMPOSITE PATCH

(71) Applicant: The Boeing Company, Chicago, IL (US)

(72) Inventors: Megan N. Watson, Kent, WA (US); Mary H. Vargas, Woodinville, WA (US); Joel P. Baldwin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/867,000

(22) Filed: Apr. 19, 2013

(65) Prior Publication Data
US 2013/0228275 A1 Sep. 5, 2013

Related U.S. Application Data

(62) Division of application No. 12/637,580, filed on Dec. 14, 2009, now Pat. No. 8,444,127.

(51) Int. Cl.
| | | |
|---|---|---|
| *B29C 73/00* | (2006.01) | |
| *B32B 43/00* | (2006.01) | |
| *B29C 65/00* | (2006.01) | |
| *C09J 5/02* | (2006.01) | |
| *B32B 37/00* | (2006.01) | |
| *B32B 37/10* | (2006.01) | |
| *B29C 73/12* | (2006.01) | |
| *B29C 73/32* | (2006.01) | |

(52) U.S. Cl.
CPC .............. *B32B 37/1018* (2013.01); *B29C 73/12* (2013.01); *B29C 73/32* (2013.01)
USPC ........... 156/94; 156/286; 156/307.4; 156/382

(58) Field of Classification Search
CPC ........ B29C 73/00; B29C 73/04; B29C 73/10; B29C 73/105; B29C 73/12; B29C 66/82661; B29C 70/44; B29C 70/443; B29C 43/12; B32B 37/00; B32B 37/10; B32B 37/1009; B32B 37/1018; B32B 27/00; C08J 5/24; B65G 47/91; B25J 15/0616; B25J 15/0683; B25B 11/005; B25B 11/007
USPC ........... 156/60, 71, 90, 94, 98, 152, 153, 154, 156/196, 212, 213, 214, 228, 242, 245, 250, 156/256, 258, 263, 264, 265, 285, 286, 289, 156/293, 303.1, 307.1, 307.3, 307.4, 307.5, 156/307.7, 311, 312, 313, 321, 349, 381, 156/382, 443, 475, 499, 579, 580, 581, 156/583.1; 414/627, 737, 752.1; 248/363; 269/21; 279/3; 294/183
See application file for complete search history.

(56) References Cited

U.S. PATENT DOCUMENTS

| | | |
|---|---|---|
| 3,076,561 A | 2/1963 | Rogers |
| 3,377,096 A | 4/1968 | Wood |

(Continued)

OTHER PUBLICATIONS

PCT International Search Report, PCT/US2010/056453, May 2, 2011.

*Primary Examiner* — Philip Tucker
*Assistant Examiner* — Brian R Slawski

(57) ABSTRACT

A method of processing a patch includes mounting the patch on a surface of a caul plate having at least one suction hole, and drawing a vacuum through the suction hole to maintain the patch in contact with the caul plate.

7 Claims, 12 Drawing Sheets

(56) References Cited

U.S. PATENT DOCUMENTS

| | | |
|---|---|---|
| 3,837,965 A | 9/1974 | Mahon et al. |
| 4,352,707 A | 10/1982 | Wengler et al. |
| 4,822,651 A | 4/1989 | Newsom |
| 5,971,454 A | 10/1999 | Baan et al. |
| 6,149,749 A | 11/2000 | McBroom |
| 6,341,808 B1 | 1/2002 | Baan et al. |
| 6,761,783 B2 | 7/2004 | Keller et al. |
| 2003/0188821 A1 | 10/2003 | Keller et al. |
| 2008/0308210 A1 | 12/2008 | Keller et al. |
| 2009/0165928 A1 | 7/2009 | Schober |

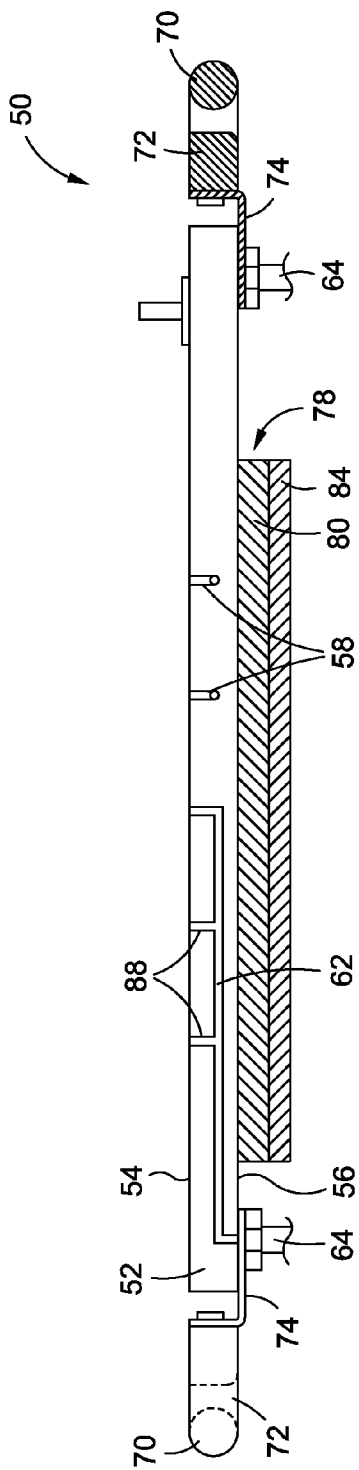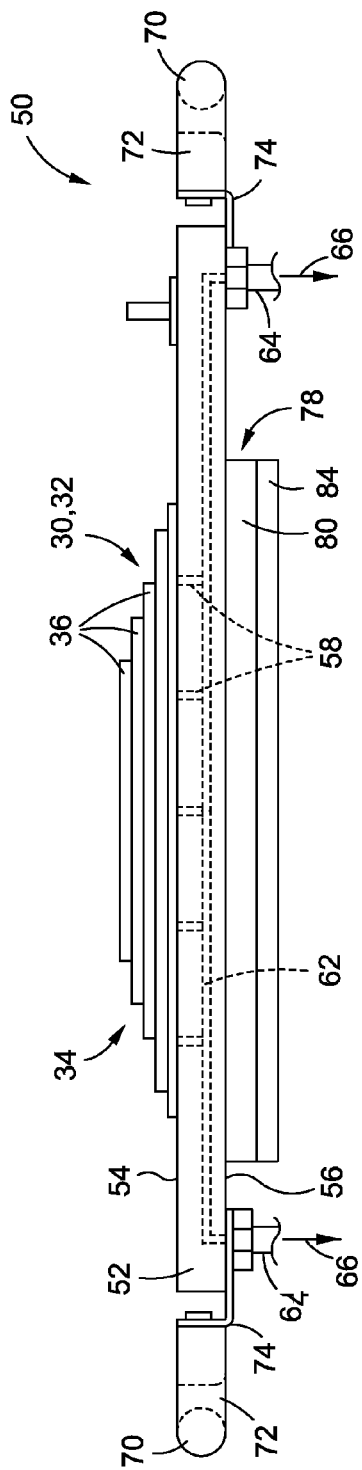

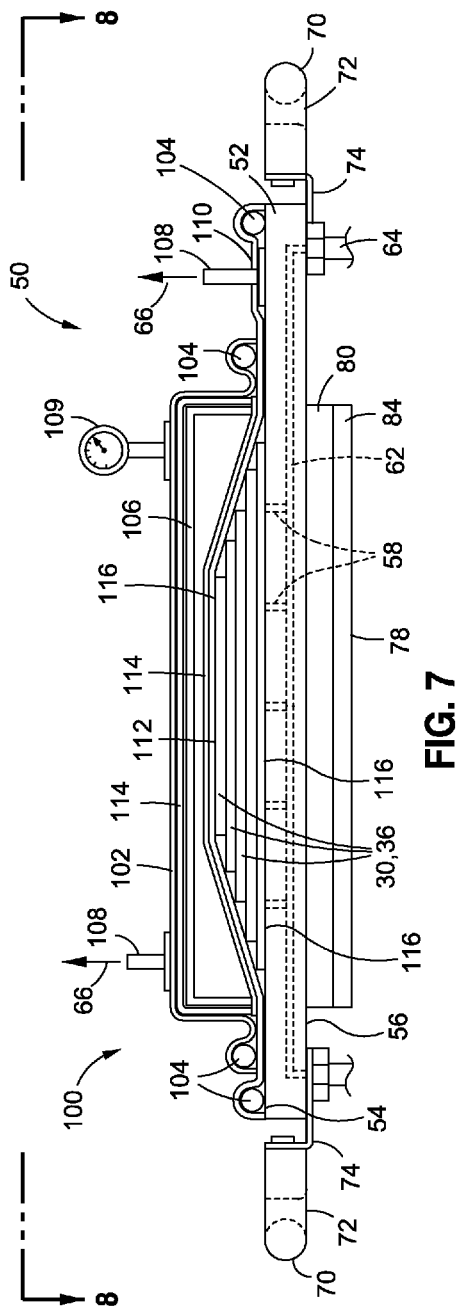

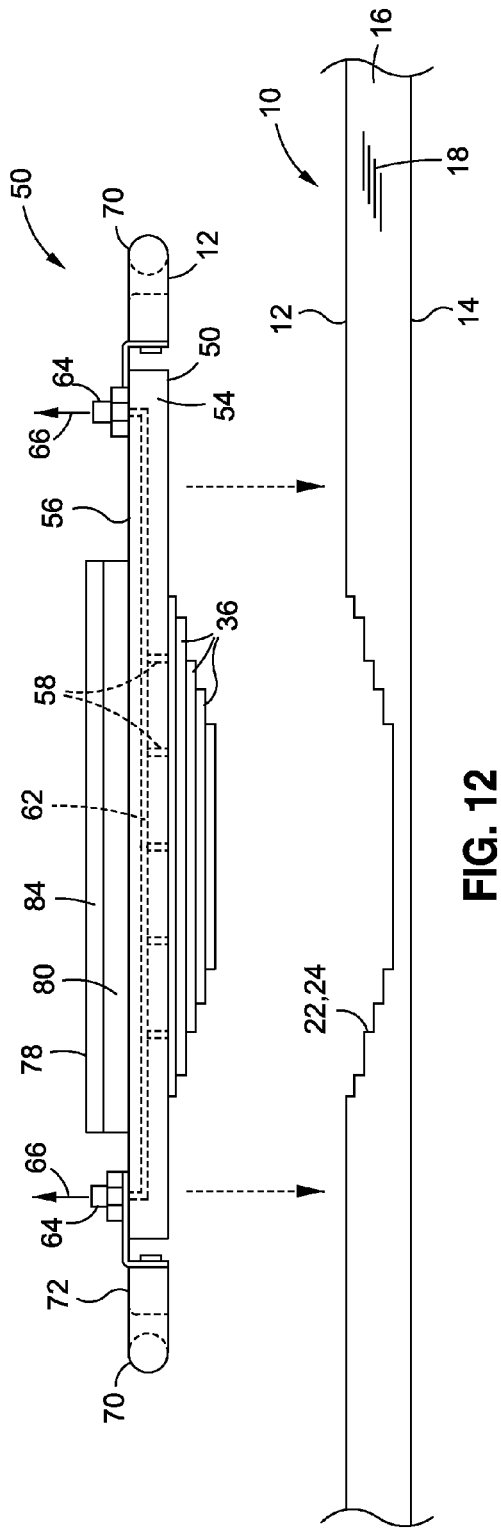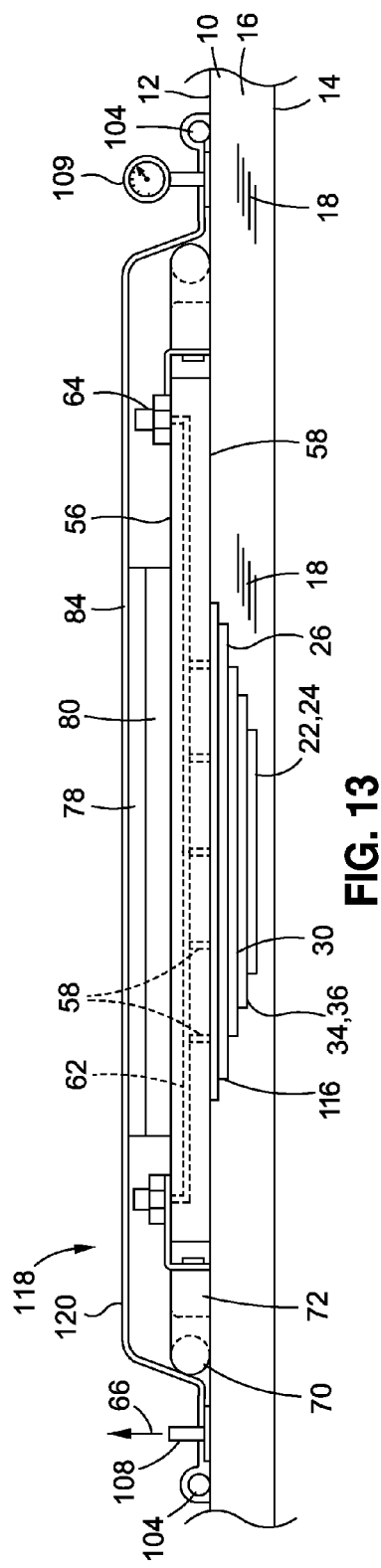

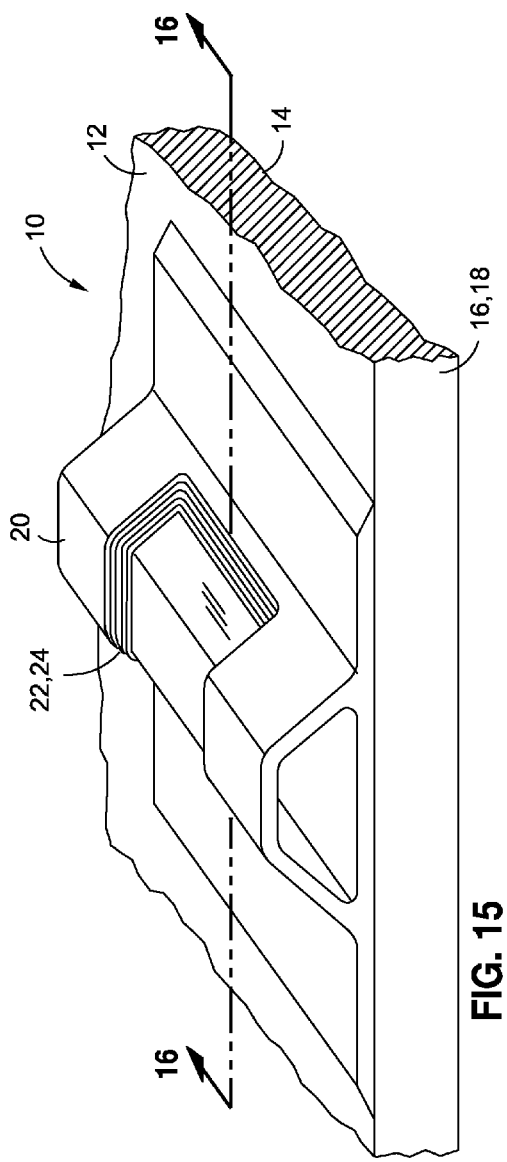
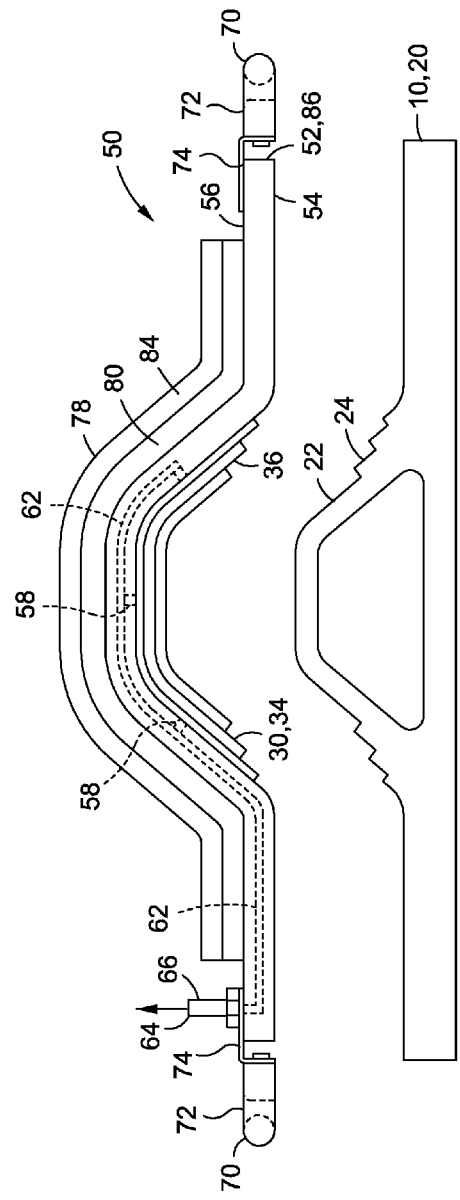

METHOD OF PROCESSING A COMPOSITE PATCH

CROSS-REFERENCE TO RELATED APPLICATIONS

The present application is a divisional application of and claims priority to U.S. application Ser. No. 12/637,580 filed on Dec. 14, 2009, now U.S. Pat. No. 8,444,127, and entitled HIGH TEMPERATURE COMPOSITE PATCH TOOL, the entire contents of which is expressly incorporated by reference herein

FIELD

The present disclosure relates generally to composite structures and, more particularly, to tools for handling and processing patches for installation in a rework area of a composite structure.

BACKGROUND

Composite materials are used in ever increasing quantities in a wide variety of industries. For example, commercial aircraft incorporate composite materials in primary and secondary structure due to the favorable mechanical properties of composite materials. Such favorable properties may translate into reduced weight of the aircraft and increased payload capacity and fuel efficiency. Furthermore, composite materials may provide an extended service life for the aircraft as compared to aircraft formed of conventional metallic construction.

Rework of composite structures is occasionally required in order to remove inconsistencies in the composite structure. Such inconsistencies may comprise localized areas that may not conform to product and/or performance specifications for any one of a variety of reasons. For example, areas of the structure may have out-of-tolerance inconsistencies which may include, without limitation, voids, dents, delaminations or porosity in the composite structure. Such localized areas of composite structures may be reworked in order to reduce or eliminate the inconsistencies. The reworking process may include removing material from the structure and replacing the removed material with a composite patch that may be bonded to the structure. The patch may be formed as a stack of plies of composite material which may be of the same or different type of material from which the composite structure is formed.

Prior to installing the patch in the rework area for bonding, it is typically desirable to remove excess air and/or volatiles that may be trapped within the plies of the composite material that make up the patch. In addition, it may be desirable to consolidate or compact the composite plies. One method of removing such volatiles is by performing a debulking operation wherein a vacuum debulking assembly may be applied over the patch. The debulking operation may be performed at a location away from the rework area. The vacuum debulking assembly may include heating the patch to facilitate the removal of volatiles and improve the compaction of the patch.

Following debulking, the heated patch may then be transferred to the rework area of a composite structure containing the rework area such as on an aircraft. The patch may be applied to the rework area in the desired orientation and may be cured in place with an adhesive to allow the patch to conform and bond to the rework area. A second option may be to temporarily mount the patch in the rework area without adhesive and then apply heat to partially cure the patch and allow the patch to conform to the rework area. The partially cured patch may then be removed from the rework area and fully cured at a location away from the rework area such as in an autoclave followed by re-installing and permanently bonding the patch to the rework area with adhesive.

For certain composite materials such as those with a bismaleimide (BMI) matrix material, the required temperatures for processing the composite materials are relatively high. For example, debulking operations performed on BMI materials may require temperatures in excess of 250° F. Curing of BMI materials may require a temperature of approximately 440° F. Furthermore, the length of time for performing a debulking operation on a patch formed of BMI materials may be relatively short due to the relatively fast rate at which BMI materials cure. In this regard, BMI composite materials at elevated temperatures may become brittle in a relatively short period of time.

The combination of the relatively high temperatures at which BMI materials must be processed and the relatively short processing window presents challenges in transferring a BMI patch to the rework area following debulking Furthermore, due to its relatively low thermal mass, the patch may cool at a relatively rapid rate during the transfer process. The cooling rate may occur at a faster rate at the edges of the patch. Such non-uniform cooling of the patch may induce thermal stresses in the patch that may lead to undesirable results. Such thermal stresses may increase when the relatively high temperature patch is installed in a relatively cooler rework area.

In addition, the high temperatures required for processing certain composite materials presents challenges associated with handling the patch when the patch is transferred to the rework area. For example, failure to support the entirety of the patch during the transfer process may result in sagging of unsupported portions of the patch such as at the edges which may affect fit-up of the patch to the rework area. In addition, sagging of unsupported areas of the patch may affect the integrity of the patch following final cure.

As can be seen, there exists a need in the art for a system and method for processing a composite patch wherein the temperature of the patch may be maintained. Furthermore, there exists a need in the art for a system and method for processing a patch that facilitates the transfer of the patch from a vacuum debulking operation to the rework area in a manner wherein the patch is supported. Preferably, such system is simple in construction and low in cost.

SUMMARY

The above-noted needs associated with uniformly heating a structure are specifically addressed by the present disclosure which provides a tool for transferring a patch to a rework area of a structure. The tool comprises a caul plate having at least one suction hole and a vacuum port fluidly coupled to the suction hole for drawing the patch against the caul plate under vacuum.

In a further embodiment, disclosed is a tool for installation of a patch on a rework area of a composite structure. The tool may comprise a substantially rigid caul plate having upper and lower surfaces and including a plurality of suction holes formed in the upper surface. The caul plate may have a plurality of passageways fluidly interconnecting the suction holes and at least one vacuum port mounted to the lower surface and being fluidly coupled to the passageways for drawing a vacuum for holding the patch to the caul plate. The tool may include a pair of insulated handles extending outwardly from the caul plate and a heating blanket assembly mounted to the lower surface. The heating blanket assembly may include a heating blanket and an insulation layer disposed on a side of the heating blanket opposite the lower surface and an alignment template disposed on the caul plate for aligning the patch with the rework area.

Further disclosed is a system for processing a patch for installation on a rework area of a composite structure. The system may comprise a tool for transferring the patch to the rework area. The tool may include a substantially rigid caul plate having upper and lower surfaces and may include a plurality of suction holes formed in the upper surface. The caul plate may have a plurality of passageways fluidly connecting the suction holes and at least one vacuum port mounted to the lower surface and being fluidly coupled to the passageways for drawing a vacuum for holding the patch to the caul plate.

A heating blanket may be mounted to the caul plate for heating the patch. The tool may include an alignment template disposed on the caul plate for aligning the patch with the rework area. The system may include a vacuum debulking assembly for consolidating the patch. The vacuum debulking assembly may include a lower bagging film for sealing the patch to the caul plate, a vacuum box mountable over the patch, and an upper bagging film extendable over the vacuum box for sealing the vacuum box to the lower bagging film.

Also disclosed is a system for processing a patch. The system may comprise a tool for transferring the patch to the rework area and may include a caul plate having upper and lower surfaces and including suction holes formed in the upper surface for drawing the patch thereagainst under vacuum. The system may include a vacuum debulking assembly mountable to the caul plate for consolidating the patch and a vacuum bag assembly for sealing the tool to the structure.

The present disclosure also includes a method of processing a patch. The method may comprise mounting the patch on a surface of a caul plate having at least one suction hole and drawing a vacuum through the suction hole to maintain the patch in contact with the caul plate.

In a further embodiment, disclosed is a method of processing a patch comprising mounting the patch on an upper surface of a caul plate having a plurality of suction holes and consolidating the patch using a vacuum debulking assembly applied to the caul plate. The method may further comprise drawing a vacuum through the suction holes to maintain the patch in contact with the caul plate and transferring the patch to the rework area using the caul plate. The patch may be thermally and heat may be applied to the patch. The method may additionally include orienting the patch relative to the rework area using an alignment template and installing the patch on the rework area. The vacuum may be removed from the suction holes and a bagging film may be placed over the caul plate and patch such that the bagging film is sealed to the rework area. A vacuum may be drawn on the bagging film. Heat may be applied to the patch to at least partially cure the patch. The method may include removing the patch from the rework area, heating the patch under pressure to fully cure the patch and reinstalling the patch in the rework area with the tool applied over the patch.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a cross-sectional illustration of the tool taken along line 5-5 of FIG. 4 and illustrating an embodiment of the tool have a plurality of passageways fluidly connecting a vacuum port to the suction holes;

FIG. 6 is a side view illustration of the tool taken along line 6-6 of FIG. 4 and illustrating a patch mounted on the caul plate;

FIG. 7 is a side view illustration of the tool having a vacuum debulking assembly coupled thereto and extending over the patch;

FIG. 8 is a top view illustration of the vacuum debulking assembly coupled to the tool;

FIG. 12 is a side view illustration of the tool having the patch retained thereto by means of a vacuum applied to the suction holes;

FIG. 13 is a cross-sectional illustration of the patch mounted within the rework area of a composite structure and having the tool sealed against the composite structure by a vacuum bag assembly;

FIG. 15 is a perspective illustration of a contoured composite structure to which a patch may be applied;

FIG. 16 is a side view illustration of a patch maintained against a caul plate configured to support contoured patches;

DETAILED DESCRIPTION

Figure 1:
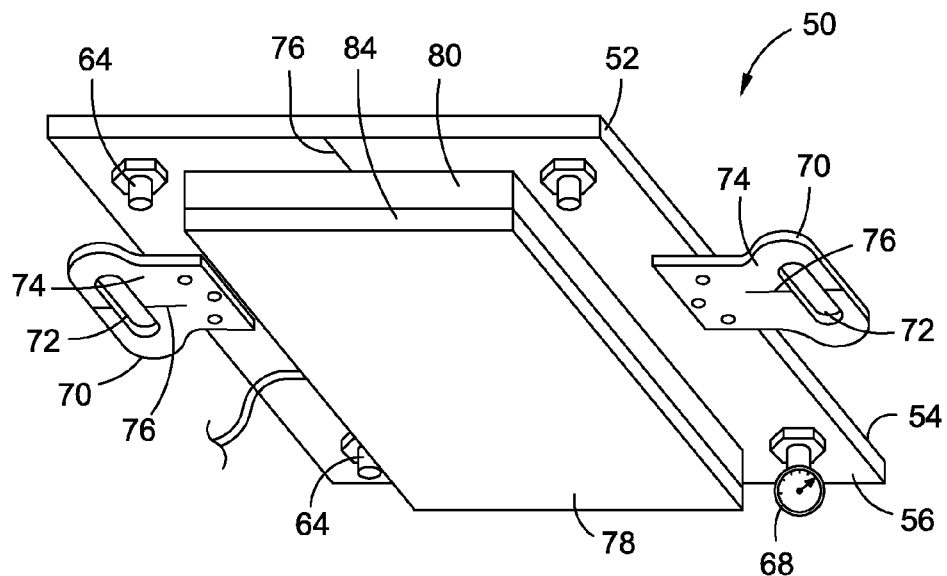
FIG. 1 is a bottom view perspective illustration of a tool having a heating blanket coupled thereto.
Figure 2:
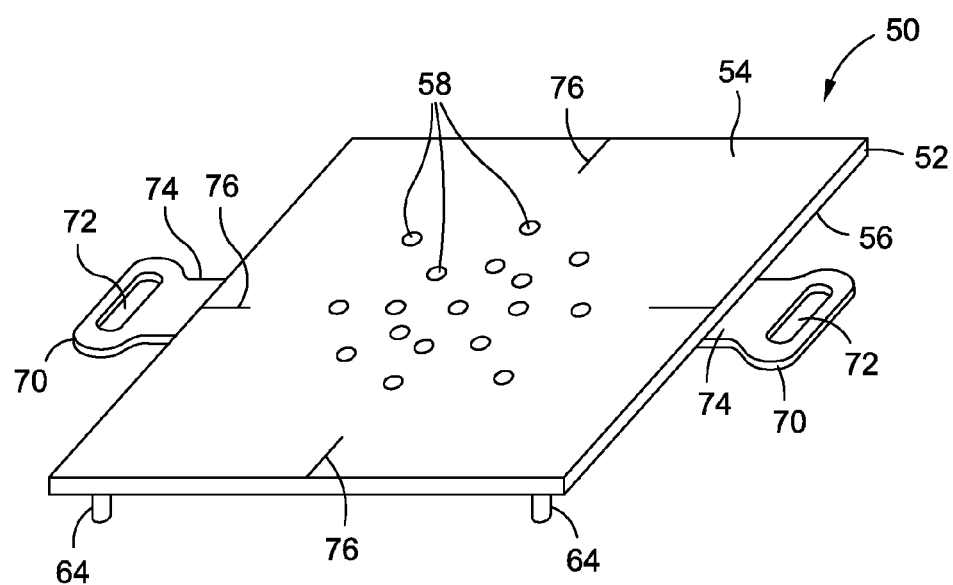
FIG. 2 is a top view perspective illustration of the tool illustrating a plurality of suction holes formed in a caul plate of the tool.
Figure 10:
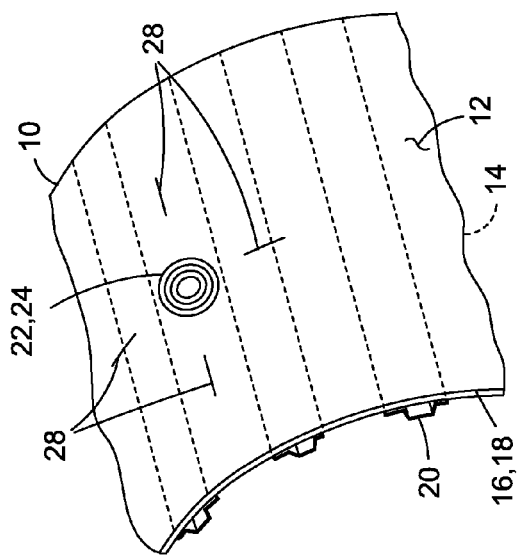
FIG. 10 is a perspective illustration of a structure having a rework area into which a patch may be installed.

Referring now to the drawings wherein the showings are for purposes of illustrating preferred and various embodiments of the disclosure only and not for purposes of limiting the same, shown in FIGS. 1 and 2 are perspective illustrations of a tool 50 as may be used for processing and handling of a patch 30 (FIG. 6) as may be installed in a rework area 22 (FIG. 10) of a composite structure 10 (FIG. 10). For example, the tool 50 may provide a means for transferring the patch 30 (FIG. 6) to the rework area 22 (FIG. 10) from a debulking operation that may be performed away from the rework area 22 (FIG. 10). Advantageously, the tool 50 may include one or more suction holes 58 (FIG. 2) to draw the patch 30 (FIG. 6) against an upper surface 54 of the caul plate 52. In this manner, the suction holes 58 (FIG. 2) provide a means for holding the patch 30 (FIG. 6) in place on the tool 50 such as when transferring the heated patch 30 (FIG. 6) without the risk of contact with the patch 30 (FIG. 6) by a technician.

As shown in FIGS. 1-2, the tool 50 may include a heating blanket assembly 78 which may include a heating blanket 80 and an optional insulation layer 84 for minimizing heat loss from the patch 30 (FIG. 6) when transporting the heated patch 30 (FIG. 6). In addition, the tool 50 may provide a means for supporting the area of the patch 30 (FIG. 6) to prevent sagging of the patch 30 (FIG. 6) such as along the edges thereof. Furthermore, the tool 50 may provide the means for applying substantially uniform pressure to the patch 30 (FIG. 6) when installing the patch 30 in the rework area 22 (FIG. 10) as is described in greater detail below.

As can be seen in FIGS. 1 and 2, the tool 50 may comprise the caul plate 52 and optionally may include the heating blanket assembly 78 mounted to a lower surface 56 of the caul plate 52. As can be seen in FIG. 2, the caul plate 52 may include a plurality of the suction holes 58 which may be fluidly coupled to one another and/or to one or more vacuum ports 64 which may extend outwardly from the lower surface 56 of the tool 50. The tool 50 may also include one or more vacuum gauges 68 for monitoring pressure applied by the vacuum ports 64. Although the tool 50 is illustrated as having vacuum ports 64 and a vacuum gauge 68 installed at the corners on the lower surface 56 of the caul plate 52, the vacuum ports 64 may be mounted at any location on the tool 50 for drawing the vacuum at the suction holes 58. The tool 50 may further include at least one handle 70 which may include a grip 72 and which may be attached to the caul plate 52 by a flange 74 or other suitable means for connecting the handle 70 to the caul plate 52. An alignment template 76 may optionally be mounted to the upper and/or lower surfaces 54, 56 of the caul plate 52 for aligning the patch 30 (FIG. 6) and/or the tool 50 with the rework area 22 (FIGS. 10-11) as described in greater detail below.

Figure 3:
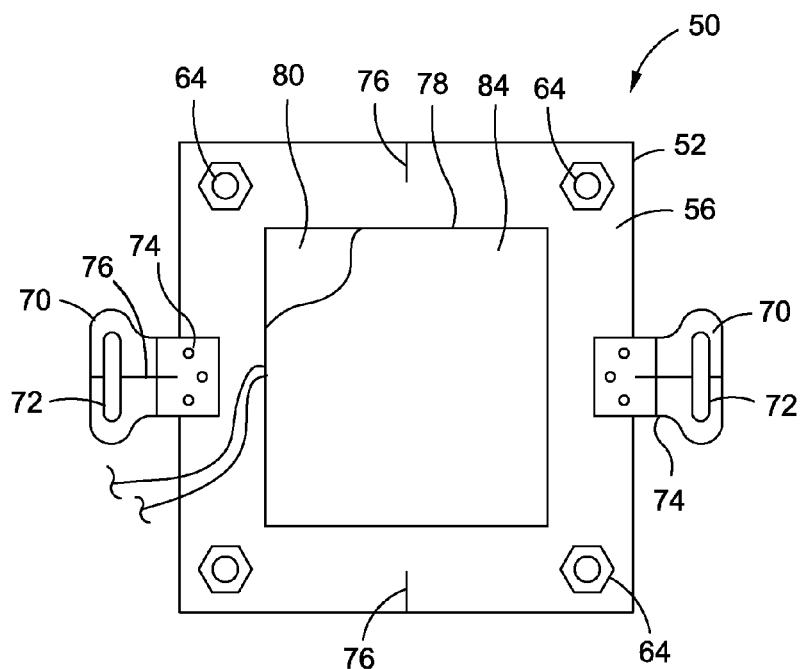
FIG. 3 is a bottom view illustration of the tool illustrating a pair of handles mounted on opposing sides thereof.
Figure 4:
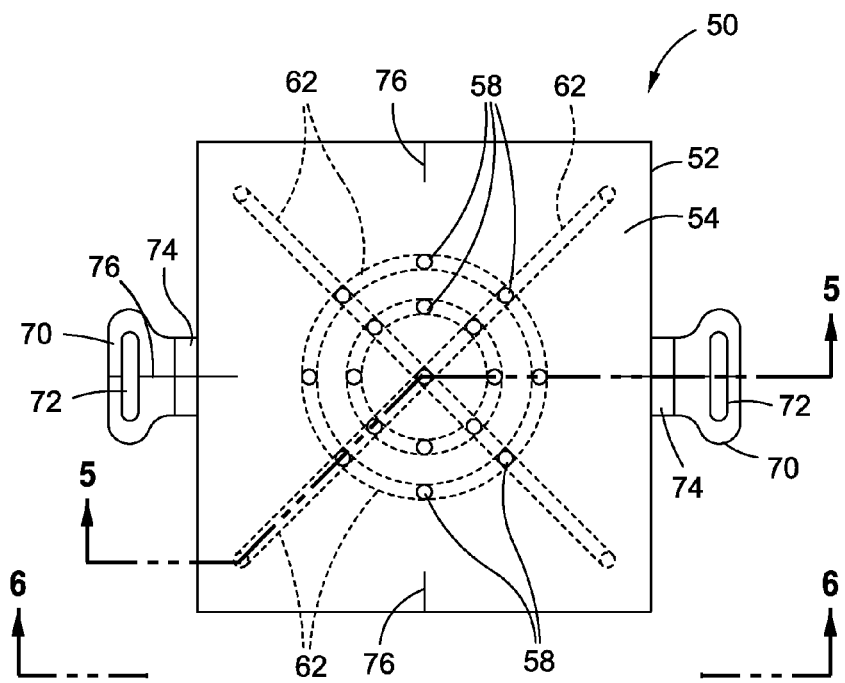
FIG. 4 is a top view illustration of the tool illustrating a plurality of suction channels formed in the caul plate.

Referring to FIGS. 3 and 4, shown are the vacuum ports 64 (FIG. 3) located at the corners of the caul plate 52. As can be seen in FIG. 4, the caul plate 52 may include a plurality of passageways 62 which may extend between the suction holes 58 and/or the vacuum ports 64 (FIG. 3) to fluidly couple the vacuum ports 64 (FIG. 3) to the suction holes 58. The passageways 62 may also be arranged to fluidly interconnect one or more of the suction holes 58. Also shown in FIGS. 3 and 4 are the handles 70 which may include grips 72 and which may be coupled to the caul plate 52 by means of the flanges 74. In FIG. 3, the heating blanket assembly 78 comprising the heating blanket 80 and the optional insulation layer 84 are shown coupled to the caul plate 52. In an embodiment, the heating blanket assembly 78 may be generally centered on the lower surface 56 of the caul plate. Although shown as having a generally orthogonal shape, the heating blanket assembly 78 may be formed in any size, shape or configuration The alignment template 76 may optionally be coupled to the upper and/or lower surfaces 54, 56 of the caul plate 52 as shown in FIGS. 3-4

Referring to FIGS. 5 and 6, shown is a cross-sectional illustration of the tool 50 in an embodiment having a passageway 62 formed within the caul plate 52 and illustrating the fluid coupling of the suction holes 58 to the vacuum port 64 via the passageways 62. The vacuum ports 64 are illustrated as being mounted on the lower surface 56 of the caul plate 52. The suction holes 58 may provide a means for maintaining the patch 30 (FIG. 6) in contact with the upper surface 54 of the caul plate 52 as illustrated in FIG. 6. In this manner, the patch 30 (FIG. 6) may be positioned in any orientation including being suspended from the caul plate 52 as may be required to install the patch 30 (FIG. 6) into a rework area 22 (FIG. 10).

The suction holes 58 may maintain the patch 30 (FIG. 6) in contact with the caul plate 52 due to the application of a suction force applied by a vacuum 66 drawn through the vacuum ports 64 as will be described in greater detail below. FIGS. 5-6 also illustrate the heating blanket assembly 78 which may comprise the heating blanket 80 and the optional insulation layer 84. As indicated above, the heating blanket assembly 78 may be coupled to the caul plate 52. The heating blanket assembly 78 may be sized and configured to extend beyond the location of the suction holes 58 and/or the patch 30 (FIG. 6) although the heating blanket assembly 78 may be provided in any size relative to the suction holes 58 and/or the patch 30 (FIG. 6).

As shown in FIG. 6, the patch plies 36 for forming the patch 30 may comprise any material such as carbon fiber reinforced plastic (CFRP) or any other suitable resin matrix (i.e., pre-impregnated) composite materials such as, without limitation, glass fiber reinforced plastic. Furthermore, the patch plies 36 may comprise dry composite materials which may be infused with resin using any suitable resin infusion process. Advantageously, the tool 50 provides a means for handling composite materials that have high temperature processing requirements. For example, the tool 50 provides a means for safely handling high temperature materials such as bismaleimide (BMI) materials which may have processing temperatures in the range of approximately 375° to 440° F. However, as was indicated above, the tool 50 may be implemented for processing composite materials of any type and is not limited to the specific examples disclosed herein.

Referring to FIGS. 1-6, handling of the caul plate 52 supporting the patch 30 may be facilitated by one or more of the handles 70 which may extend outwardly from any location of the caul plate 52. For example, as shown in FIGS. 1-6, the handles 70 may extend outwardly from opposed sides of the caul plate 52. The handles 70 are preferably formed in such a manner as to minimize heat conduction from the caul plate 52 to the handles 70. In this regard, the handles 70 may include the grip 72 portions which may be formed of insulating material. The handles 70 may be mounted to the caul plate 52 by any suitable means.

For example, as best seen in FIGS. 5-6, each one of the handles 70 may be mounted to the caul plate 52 by means of a flange 74 configured to minimize conduction of heat from the heated caul plate 52. The handle 70 may be connected to the caul plate 52 by mechanical fasteners as illustrated in FIG. 3 and/or by bonding or any other suitable means. Furthermore, it is also contemplated that the handle 70 may be integrally formed with the caul plate 52 in such a manner as to minimize the thermal conductivity of heat from the caul plate 52 into the handle 70. The handle 70 may optionally include the insulated grip 72 as indicated above in order to reduce exposure of extreme temperatures to a technician grasping the handle 70.

Referring still to FIGS. 1-6, the caul plate 52 may be formed of any suitable materials including, without limitation, titanium, aluminum, copper, ceramic, composite material or any combination of materials or any other suitable metallic or non-metallic material. For example, the caul plate 52 may be formed of composite material. The caul plate 52 is preferably formed of a substantially rigid material in order to provide a stable surface for processing the patch 30 (FIG. 6). For example, the caul plate 52 is preferably formed to provide substantial stiffness to facilitate debulking of the patch 30 (FIG. 6) on the caul plate 52. Furthermore, the caul plate 52 is preferably sufficiently stiff such that the caul plate 52 may provide a relatively uniform distribution of pressure to the patch 30 (FIG. 6) when the patch 30 is installed in the rework area. In this regard, the caul plate 52 may be held against the repair patch 30 (FIG. 6) by a vacuum bagging operation such as during curing of the patch 30 and/or when bonding the patch 30 to the rework area 22 (FIG. 10). In this regard, the caul plate 52 is preferably provided in a size that is larger than the size of the patch 30 (FIG. 6). Ideally, the patch 30 (FIG. 6) preferably has a relatively smooth surface free of protrusions in order to provide a smooth surface for applying pressure to the patch 30 (FIG. 6) such as when installed to the rework area 22 (FIG. 10).

Figure 11:
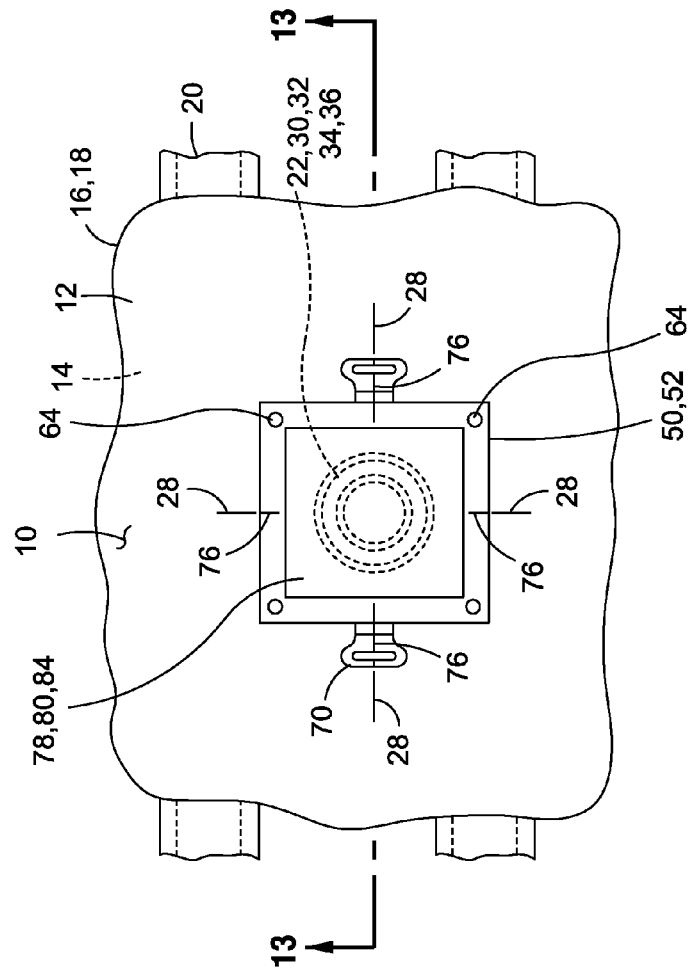
FIG. 11 is a top view illustration of the structure of FIG. 10 and illustrating the tool and patch applied to the rework area.

In this regard and referring briefly to FIGS. 10 and 11, the patch 30 (FIG. 11) may be provided in any shape such as a planar shape or a contoured shape that is complementary to the shape of the composite structure 10 being reworked. For example, FIG. 10 illustrates a rework area 22 formed in a composite structure 10 comprising a skin member 16 having a curved shape. The tool 50 is preferably sized and configured such that the caul plate 52 substantially conforms to the shape of the rework area 22 on the composite structure 10. In this manner, substantially uniform pressure may be applied across the patch 30 during final curing or during bonding of the patch 30 (FIG. 11) to the rework area 22 (FIG. 10) as will be described in greater detail below.

Further in this regard and referring briefly to FIGS. 15-16, the tool 50 may be configured such that the caul plate 52 is formed complementary to a complexly shaped or contoured structure 10. For example, FIGS. 15 and 16 illustrate a stringer 20 mounted to a skin member 16 and wherein the stringer 20 includes a rework area 22 wherein material may have been removed for receiving the patch 30 (FIG. 16). FIG. 16 illustrates the tool 50 wherein the caul plate 52 is formed complementary to the stringer 20 such that the caul plate 52 substantially matches the contour or shape of the stringer 20. In this regard, the caul plate 52 may be formed of moldable material which may be applied to a structure having a shape similar to the composite structure 10 being reworked. The contoured caul plate 52 may be assembled into the tool 50 and may include vacuum ports 64, suction holes 58 and passageways 62 fluidly connecting the vacuum ports 64 to the suction holes 58 such that the patch 30 may be maintained in contact with the caul plate 52 upon drawing a vacuum 66 through the suction holes 58 as will be described in greater detail below.

Advantageously, the tool 50 is preferably configured such that the caul plate 52 provides support to the patch 30 during transfer of the patch 30 from different locations such as from a debulking location to the installation of the patch 30 on the rework area 22 on the composite structure 10 which may be located on a vehicle. In this regard, the relatively stiff caul plate 52 may facilitate the transfer of the patch 30 while minimizing mechanical stresses within the patch 30. In addition, the caul plate 52 may prevent warping and/or flexing of the patch 30 prior to the installation in the rework area 22 (FIGS. 10 and 16). However, it is also contemplated that the caul plate 52 may be provided in an embodiment having a controlled amount of flexibility. For example, the caul plate 52 may be fabricated of relatively thin metallic sheet such as aluminum and/or copper sheet which to provide a degree of flexibility that may facilitate substantially conformal fit of the caul plate 52 to slightly curved or contoured surfaces.

Referring to FIGS. 1-6, the tool 50 may further include the heating blanket 80 which may optionally be mounted on the lower surface 56 of the tool 50 opposite the upper surface 54 upon which the patch may be supported. The heating blanket assembly 78 may comprise the heating blanket 80 and the optional insulating layer 84. The insulating layer 84 may provide a means for reducing heat loss from the patch 30 during transfer. For example, the insulation layer 84 may prevent or at least reduce heat loss when transferring the patch 30 (FIG. 6) from a vacuum debulking operation to the rework area 22 (FIG. 10). As was earlier indicated, certain composite materials from which the patch 30 (FIG. 6) may be formed require processing at relatively high temperatures. For example, during a debulking operation, the heating blanket 80 may heat the patch 30 (FIG. 7) to a relatively high temperature to facilitate the evacuation of air and/or volatiles that may be trapped within the composite plies that make up the patch 30 (FIG. 7). The heating blanket 80 may maintain also the patch 30 (FIGS. 12-13) at such relatively high temperatures during transfer of the patch 30 (FIGS. 12-13) to the rework area (FIGS. 12-13) following the debulking operation.

Referring still to FIGS. 1-6, the heating blanket assembly 78 may include the heating blanket 80 which may be configured to heat up the patch 30 (FIG. 6) by conduction of heat through the caul plate 52. The heating blanket 80 may heat up the patch 30 at a rate corresponding to the material requirements of the composite material that makes up the patch 30 (FIG. 6). The heating blanket 80 may comprise any suitable heating blanket 80 configuration such as, without limitation, any suitable resistive wire configuration. However, the heating blanket 80 may be provided in any configuration and is not limited to resistive wire arrangements. As was earlier indicated, the insulation layer 84 may optionally be included on an exterior side of the heating blanket 80 to minimize heat loss from the patch 30 (FIG. 6). The insulation layer 84 may be provided as a layer of silicon or any other suitable material having favorable insulative properties. Thermal sensors (not shown) such as thermocouples may optionally be mounted at strategic locations along the upper and/or lower sides 54, 56 of the caul plate 52 to provide a means for monitoring the temperature of the patch 30 (FIG. 6) and/or caul plate 52. The insulation layer 84 may be formed of any suitable material including Viton or any other material having insulative properties and which is mechanically and thermally stable at the operating temperatures.

Referring briefly to FIGS. 2 and 4 and 10-11, the tool 50 may optionally include an alignment template 76 or functionally equivalent structure or arrangement for aligning the patch 30 (FIG. 6) with the rework area 22 (FIGS. 10-11). For example, the alignment template 76 may comprise a separate layer of material which may be applied to the upper surface 54 of the caul plate 52. Alternatively, the alignment template 76 may comprise temporary or permanent markings such as line segments or other features which may be printed, applied, embossed or engraved within the upper surface 54 of the caul plate 52 and which may be alignable with corresponding markings formed on the structure.

For example, referring briefly to FIGS. 10 and 11, a complementary set of alignment marks 28 may be formed on the outer mold line 12 of the composite structure 10 for facilitating alignment with the alignment template 76 (FIG. 11) of the caul plate 52 (FIG. 11). In this regard, the alignment template 76 (FIG. 11) or functional equivalent may be provided on the upper and/or lower surfaces 54, 56 (FIGS. 3-4) of the caul plate 52 in a mirror set of markings The alignment template 76 on the upper surface 54 (FIGS. 3-4) of the caul plate 52 may facilitate layup of the patch plies 36 (FIG. 6) that make up the patch 30 (FIG. 6). The lower surface 56 (FIGS. 3-4) of the caul plate 52 may also be configured to facilitate alignment of the tool 50 with the reword area 22 (FIG. 11) for aligning and orientating the patch 30 (FIG. 11) in the rework area 22 (FIG. 11).

The caul plate 52 may include the suction holes 58 (FIG. 4) arranged in spaced relation to one another on the upper surface 54 (FIG. 4) of the caul plate 52 to correspond to the patch 30 (FIG. 6) that may be mounted on the caul plate 52. As illustrated in FIGS. 2 and 4, the suction holes 58 may be arranged in a circular pattern which may correspond to a circular patch. However, the suction holes 58 may be arranged in any configuration including the circular pattern shown in FIGS. 2 and 4 or in any other pattern that may preferably be arranged complementary to the shape of the patch 30 (FIG. 6).

Referring to FIGS. 7 and 8, shown is the tool 50 having a vacuum debulking assembly 100 mounted thereto over the patch 30. As was earlier indicated, vacuum debulking provides a means for improving the strength characteristics of the patch 30 by removing trapped air and/or volatiles and compacting the patch 30. The debulking may be performed with the application of minimal heat in order to minimize the cure state of the patch 30. As can be seen in FIG. 7, the vacuum debulking assembly 100 may be applied to the tool 50. The vacuum debulking assembly 100 may comprise a lower bagging film 110 which may be sealed to the upper surface 54 of the caul plate 52 in a manner that envelopes the patch 30. One or more vacuum ports 108 may be located on the caul plate 52 and may provide a means to pull a vacuum on the lower bagging film 110.

For example, as shown in FIGS. 7 and 8, a vacuum port 108 may be extended through the lower bagging film 110 on a right hand side of the patch 30. The patch 30 may be mounted on the upper surface 54 with a layer of parting film 116 inserted between the patch 30 and the caul plate 52 to prevent bonding therebetween during the application of heat during the vacuum debulking process. Apertures may be formed in the parting film 116 corresponding to the location of the suction holes 58 in the caul plate 52 to provide a means for drawing a vacuum on the patch 30 to hold the patch 30 against the caul plate 52. A breather layer 114 may optionally be installed over the patch 30 between the lower bagging film 110 and the patch 30 to facilitate the substantially uniform application of a vacuum over the area of the lower bagging film 110. The breather layer 114 is preferably a porous material that provides a continuous air path over the patch 30. A bleeder layer 112 may optionally be included to absorb excess resin from the patch 30 during the debulking operation. Furthermore, perforated or non-perforated parting film 116 may be included between the breather layer 114 and the patch.

Referring still to FIG. 7, the vacuum debulking assembly 100 may further include a vacuum box 106 which may be applied over the lower bagging film 110. The vacuum box 106 may optionally be separated from contact with the lower bagging film 110 by means of a breather layer 114. An upper bagging film 102 may be applied to at least partially overlap the lower bagging film 110. The upper bagging film 102 may extend over the vacuum box 106 and may be sealed to the lower bagging film 110 by means of a sealant 104 such as, without limitation, sealant 104 tape extending around a perimeter of the patch 30. As can be seen, the sealant 104 may be mounted over the lower bagging film 110 to secure or seal the upper bagging film 102 thereto. The lower bagging film 110 may be sealed to the upper surfaces 54 of the caul plate 52 with sealant 104 or functional equivalent. The vacuum box 106 may provide a means for relieving compaction pressure on the patch 30 when the level of the vacuum within the upper bagging film 102 is approximately equal to or slightly less than the level of vacuum within the lower bagging film 110. Upon heating the patch 30, the resin viscosity may be reduced such that air or other gasses entrapped within the patch plies 36 of composite material may be evacuated.

Vacuum debulking may minimize the occurrence of porosity within the cured patch 30 by drawing volatiles and/or air from the patch plies 36 before they are compacted. In this regard, the vacuum debulking operation may include the removal of the upper bagging film 102 and vacuum box 106 prior to the resin reaching the glass transition temperature where the resin starts to thicken and set up. Removal of the upper bagging film 102 and vacuum box 106 may permit the application of a vacuum pressure on the patch 30 for compacting the patch plies 36 after removal of the volatiles.

Figure 9:
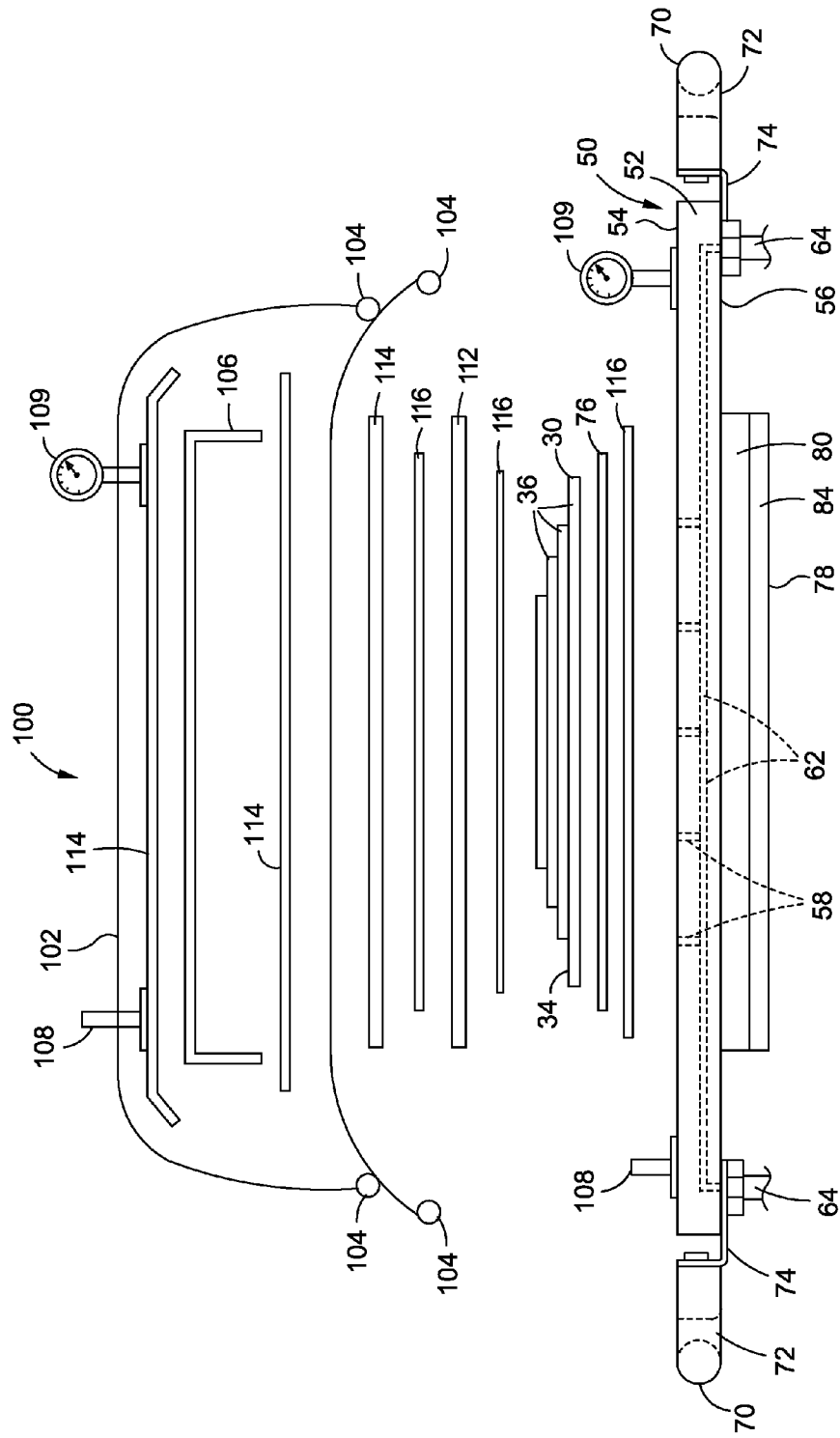
FIG. 9 is an exploded side view illustration of the vacuum debulking assembly and patch mounted to the tool.

Referring to FIG. 9, shown is an exploded side view of the components that make up the vacuum debulking assembly 100 illustrated in FIGS. 7 and 8. As can be seen in FIG. 9, the upper bagging film 102 may be sealed to the lower bagging film 110 by means of the sealant 104. One or more breather layers 114 may be installed between the vacuum box 106 and the upper bagging film 102 and/or between the vacuum box 106 and the lower bagging film 110 to facilitate the application of the vacuum. The lower bagging film 110 may envelope the patch 30 and may include breather layer 114, non-porous parting film 116 underneath the breather layer 114, bleeder layer 112 underneath the non-porous parting film 116, porous parting film 116 underneath the bleeder layer 12 and which may be applied over the patch 30. The patch 30 may, in turn, be mounted on an alignment template 76 (FIG. 4) if provided as a separate layer. Porous and/or non-porous parting film 116 may be installed between the patch 30 and the upper surface 54 of the caul plate 52 and may include apertures in alignment with the suction holes 58 formed such that suction may be applied to the patch 30. One or more pressure gauges 109 may be mounted to the upper and/or lower bagging film 102, 110 in order to provide a means for monitoring the relative vacuum pressures.

Referring to FIGS. 10 and 11, shown is a composite structure 10 which may comprise a skin member 16 having one or more stiffeners, stringers 20 or other components that may be mounted to the inner mold line 14 thereof or to any other location on the skin member 16. FIG. 10 illustrates a rework area 22 formed in the skin member 16 on the outer mold line 12 thereof. The skin member 16 may be formed of plies of material or parent plies 18. The rework area 22 may comprise an area wherein material or parent plies 18 may be removed from the composite structure 10 such as to remove an inconsistency. The rework area 22 may include a scarf 24 or a tapered edge which may be formed as lap steps or as substantially smooth ramp extending therearound. For example, as shown in FIGS. 12-13, the scarf may be formed as a series of lap steps corresponding to the parent plies 18 and the patch plies 36. Alternatively, the scarf 24 may be formed as a substantially smooth ramp or angled surface (not shown) extending around the scarf 24. It should also be noted that the rework area 22 may be formed in the skin member 16 on the inner mold line 14 thereof. Even further, the rework area 22 may be formed in the skin member 16 on both the inner and outer mold lines 14, 12 of the skin member 16. FIG. 10 further illustrates a set of alignment marks 28 formed on the outer mold line 12 of the skin member 16 and which may be provided as a means for positioning and orienting the patch 30 in the rework area 22 using the tool 50.

Referring to FIGS. 11, shown is a plan view of the tool 50 applied to the outer mold lines 12 of the composite structure 10. As can be seen, the alignment template 76 or functional equivalent thereof on the tool 50 may be aligned with the alignment marks 28 formed on the composite structure 10. Transferring of the patch 30 to the rework area 22 may occur at any time during processing of the patch 30 (FIG. 12). For example, transferring of the patch 30 (FIG. 12) to the rework area 22 may occur following the vacuum debulking operation and removal of the vacuum debulking assembly 100 (FIG. 9)

as described above with regard to FIG. 9. However, transferring of the patch 30 (FIG. 12) to the rework area 22 may occur following placing the patch 30 on the tool 50 (FIG. 12) such as following layup of the patch plies 36 (FIG. 12) and vacuum debulking of the patch 30 which may be performed on or off the tool 50 (FIG. 12). Transferring of the patch 30 to the rework area 22 may be facilitated by the application of a vacuum pressure to the vacuum ports 64 (FIG. 12) such that the vacuum is applied to the patch 30 at the suction holes 58 and the patch 30 is drawn against the upper surface 54 of the caul plate 52 (FIG. 12).

As can be seen in FIGS. 12 and 13, the tool 50 may be inverted depending upon the orientation of the rework area. The patch 30 may be maintained in engagement with the reword tool by means of vacuum applied to the suction holes 58 after removal of the vacuum debulking assembly 100 described above with regard to FIG. 9. The caul plate 52 may be held by one or more technicians and the patch 30 positioned into alignment with the rework area 22 using the alignment marks 28 (FIG. 11) on the composite structure 10 and the alignment template 76 (FIG. 11) on the caul plate 52. FIG. 13 illustrates a cross-sectional view of the patch 30 installed in the rework area 22 such that the scarf 24 or taper angle formed in the rework area 22 is in substantially uniform contact with the scarf 34 formed on the boundary of the patch 30. In this regard, it can be seen in FIG. 13 that the patch plies 36 which make up the patch 30 are preferably at least substantially vertically aligned with the parent plies 18 which make up the composite structure 10.

Referring to FIG. 13, shown is the vacuum bag assembly 118 mounted over the tool 50 with the patch 30 inside the rework area 22. In this regard, the transfer of the patch 30 from the vacuum debulking operation to the rework area 22 may occur with the patch 30 being maintained at a desired temperature. The heating blanket 80 may optionally be activated in order to provide heat input to the patch 30 during the transfer process and/or while the patch 30 is installed within the rework area 22. The insulation layer 84 may facilitate maintenance of the temperature of the patch 30. Referring still to FIG. 13, the vacuum bag assembly 118 is illustrated as being sealed to the composite structure 10 by means of sealant 104. The vacuum ports 64 illustrated as being mounted on the lower surface 56 of the caul plate 52 may optionally be removed to minimize obstructions over which the bagging film 120 may be applied. A breather layer 114 may optionally be installed between the bagging film 120 and the heating blanket 80 and tool 50 to facilitate substantially uniform application of vacuum pressure such as via the vacuum port 108. Vacuum pressure may be monitored by a vacuum gauge 109 optionally included on the caul plate 52 at any suitable location.

Heat may be continuously applied to the patch 30 when installed in the rework area 22 as illustrated in FIG. 13 in order to maintain the patch 30 in a flexible state to facilitate the substantial conformance of the patch 30 to the rework area 22. Parting film 116 may be installed between the patch 30 and rework area 22 prior to installation of the patch 30 within the rework area 22 to allow for later removal of the patch 30 for final curing of the patch away from the rework area 22 as may be required for relatively high-temperature materials such as bismaleimide (BMI) matrix material. Vacuum may be applied to the bagging film 120 causing the caul plate 52 to apply pressure across the patch 30 such that the patch 30 at least substantially conforms to the shape of the rework area. Due to temperature limitations associated with the reworking of the composite structure 10, final cure of the patch 30 may occur with the patch 30 removed from the rework area 22. In this regard, certain high-temperature composite materials such as BMI materials may have a curing temperature that exceeds the allowable temperature to which certain composite structures 10 may be heated. For example, BMI material has a cure temperature of approximately 440° which may exceed the maximum temperature at which rework may be performed. In this regard, aircraft operations may limit the temperature to which the aircraft structure may be heated to 350°.

The installation of a patch 30 fabricated of BMI composite material may include the installation of the parting film 116 (FIG. 13) between the patch 30 and the rework area 22 to prevent bonding therebetween. The patch 30 may be maintained at a reduced temperature by means of the heating blanket 80 to facilitate substantial conformance of the patch 30 to the rework area 22 in a partially cured state. Pressure may be applied for a predetermined amount of time using the vacuum bag assembly 118 (FIG. 13) after which the vacuum bag assembly 118 (FIG. 13) and the partially cured patch 30 may be removed. The patch 30 may be substantially fully cured such as in an autoclave under pressure. In this regard, the tool 50 may provide a means for withdrawing the patch 30 from the rework area 22 after removal of the bagging film 120 and applying a vacuum to the vacuum ports 64 to hold the patch 30 against the caul plate 52. Likewise, bonding of the patch 30 after fully curing the patch 30 in the autoclave may be performed with the tool 50 by aligning the alignment template 76 (FIG. 11) of the caul plate 52 with the alignment marks 28 (FIGS. 10-11) on the outer mold line 12 of the composite structure 10 as was indicated above and illustrated in FIGS. 10 and 11. Referring to FIG. 13, heat may again be applied to the patch 30 and rework area 22 by activating the heating blanket 80 in order to cure adhesive 26 (FIG. 13) between the patch 30 and the rework area 22. Pressure may also be applied to the patch 30 by reinstalling a bagging film 120 and pulling a vacuum 66 on the bagging film 120 in a manner similar to that which is illustrated in FIG. 13.

Figure 14:
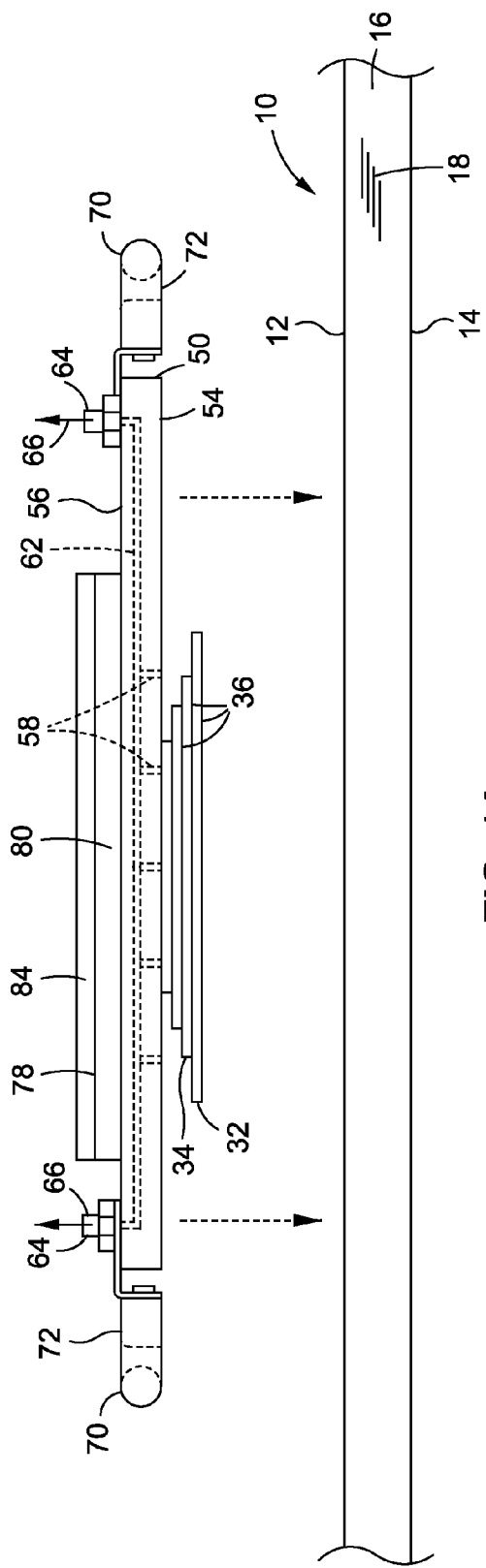
FIG. 14 is a side view illustration of the tool having a doubler maintained against the caul plate by means of suction applied to the suction holes.

Referring to FIG. 14, the patch 30 may be provided in a doubler 32 embodiment wherein the doubler 32 may be overlaid onto an outer mold line 12 of the rework area 22 within which a consistency may exist. Likewise, the doubler 32 may be overlaid onto an inner mold line 14 of the rework area 22. In this regard, the doubler 32 may be prepared in a manner similar to that which was described above with regard to the patch 30 including vacuum debulking similar to that which is shown in FIGS. 7 and 8 followed by transferring the doubler 32 to the rework area 22 as shown in FIG. 14. The patch 30 may be maintained in contact with the caul plate 52 during transfer of the patch to the rework area 22 by the application of vacuum 66 to the vacuum ports 64. The patch 30 may be positioned and aligned via alignment marks 28 (FIGS. 10-11) formed on the composite structure 10 in a manner similar to that which is illustrated in FIGS. 10 and 11 and described above. The doubler 32 may be partially cured by heating with the heating blanket 80 to allow the interfacing areas of the doubler 32 and rework area 22 to substantially conform in a manner similar to that which is described above and illustrated in FIG. 13.

Referring to FIGS. 15 and 16, shown is an alternative embodiment of the tool 50 wherein the caul plate 52 is shaped complementary to a contour of the composite structure 10. The composite structure 10 is illustrated as including a stringer 20 mounted on the inner mold line 14 of the composite structure 10. The stringer 20 may include an inconsistency which may be removed by the removal of stringer 20 material from the rework area 22 as illustrated in FIG. 15. A scarf 24 may be formed on the perimeter of the rework area 22 and a patch 30 may be laid up and processed in a manner similar to that which is illustrated in FIGS. 7, 12 and 13. The caul plate 52 may be formed of a material that may be substantially moldable to the structure 10 and which may be applied to the structure 10 to form a splash 86 thereof. For example, the caul plate 52 may be formed from moldable material contained within a membrane such as a flexible rubber bag that may be filled with a formable compound which may harden upon the application of heat or exposure to air. Once the caul plate 52 is formed, the patch plies 36 may be laid up in the desired orientation and sequence.

Referring still to FIG. 16, the tool 50 may include a heating blanket 80 mounted on the lower surface 56 of the caul plate 52 and which may optionally include an insulation layer 84 similar to that which is described above with reference to the tool 50 illustrated in FIGS. 1-13. For example, the tool 50 illustrated in FIG. 16 may include one or more handles 70 optionally including insulative grips 72 and extending outwardly from the caul plate 52. The tool 50 may include one or more vacuum ports 64 which may be fluidly coupled to a plurality of suction holes 58 via passageways 62 for vacuum drawing of the patch 30 to the upper surface 54 of the caul plate 52. A vacuum debulking operation may be performed on the patch 30 configuration illustrated in FIG. 16 similar to that which is described above and illustrated in FIG. 7. Likewise, the application and installation of the patch 30 to the rework area 22 illustrated in FIGS. 15 and 16 may be performed similar to that which is described above with reference to FIGS. 12 and 13.

Figure 17:
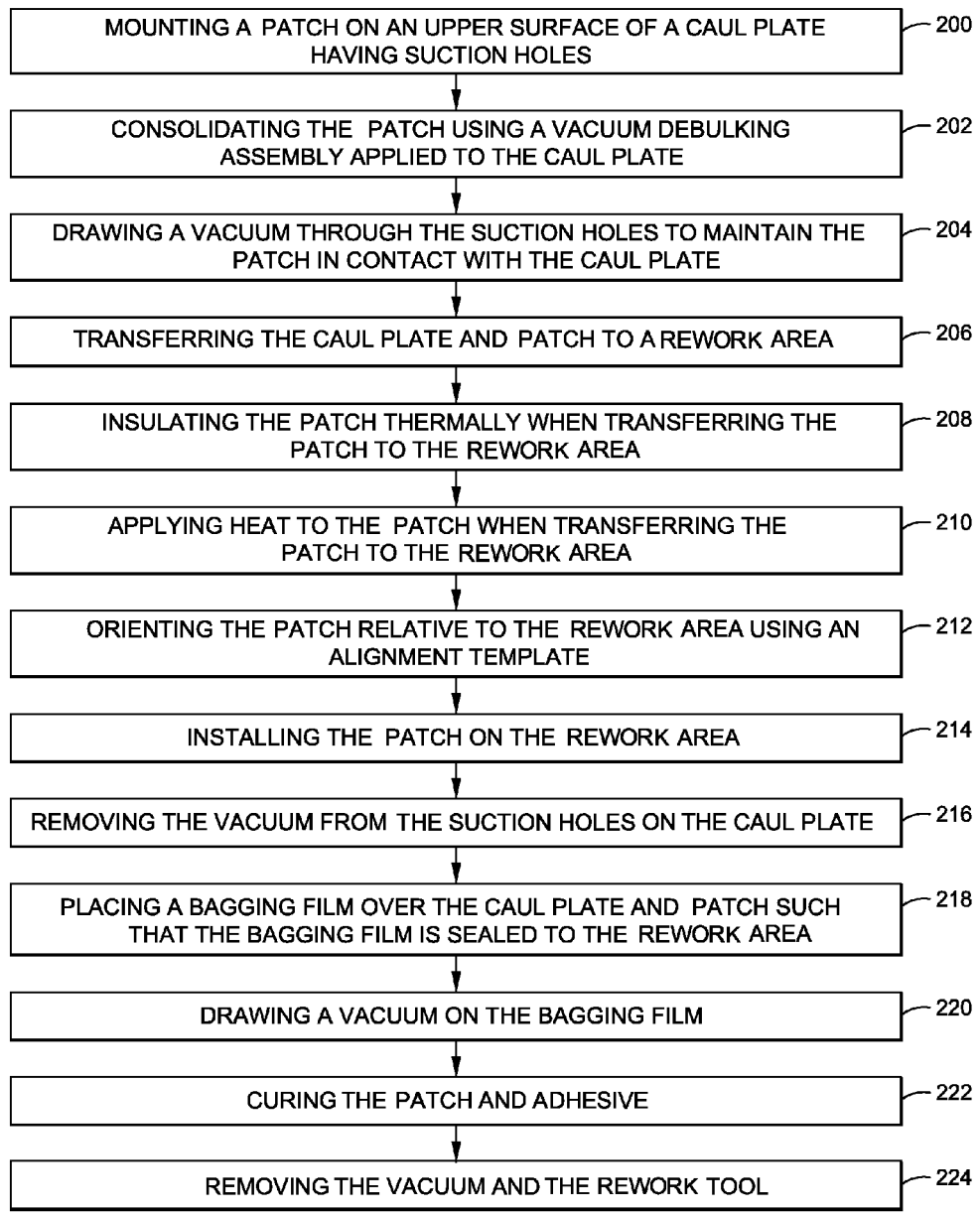
FIG. 17 is an illustration of a flow diagram of a methodology for reworking a composite structure using a tool.

Referring now to FIG. 17, shown is an illustration of a flow diagram of a methodology for processing a patch 30 (FIG. 6). The method may comprise step 200 of mounting the patch 30 (FIG. 6) on the upper surface 54 (FIG. 6) of the caul plate 52 (FIG. 6) such as by laying up a stack of patch plies 36 (FIG. 6) in the desired orientation and stacking sequence. Step 202 may comprise consolidating or compacting the patch 30 (FIG. 7) such as by using a vacuum debulking assembly 100 as illustrated in FIGS. 7-9. As was indicated above, vacuum debulking of the patch 30 (FIG. 7) may facilitate the removal of trapped air within the patch plies 36 (FIG. 7) that make up the patch 30 such that the patch 30 may be compacted with the application of a mild amount of heat in order to prevent the occurrence of voids or porosity within the cured part. Step 204 may comprise drawing a vacuum 66 (FIG. 12) through the suction holes 58 (FIG. 7) by applying a vacuum 66 (FIG. 7) to one or more of the vacuum ports 64 (FIG. 7) which may be mounted on the caul plate 52. By applying the vacuum 66 to the suction holes 58, movement of the patch 30 (FIG. 7) may be prevented during vacuum debulking and other operations.

Referring still to FIG. 17, the methodology may comprise transferring the patch 30 (FIG. 12) such as from a debulking operation to a rework area 22 (FIGS. 10-12) in step 206. The patch 30 (FIG. 12) may be supported by the caul plate 52 which may be lifted and carried by means of one or more handles 70 having grips 72 which are preferably insulated from the caul plate 52 (FIG. 12). Step 208 may comprise insulating the patch 30 (FIG. 12) against radiative losses or other losses when transferring the patch 30 (FIG. 12) to the rework area 22 (FIG. 12) by including insulation layer 84 on the heating blanket 80 (FIG. 12). Likewise, step 210 may comprise applying heat to the patch 30 (FIG. 12) when transferring the patch 30. Heat may be applied by the heating blanket 80 (FIG. 12) at the desired heating rate in order to maintain the temperature of the patch 30 within a desired temperature range. Step 212 may comprise orienting the patch 30 (FIG. 11) relative to the rework area 22 such as by using the alignment template 76 (FIG. 11) or functional equivalent which may be included with the tool 50 (FIG. 11) as described above. The orientation and positioning of the patch 30 may occur relative to alignment marks 28 (FIGS. 10-11) optionally formed on the outer mold lines 12 (FIG. 10) of the composite structure 10 as indicated above and illustrated with reference to FIGS. 10 and 11.

Step 214 may comprise installing the patch 30 within the rework area 22 as shown in FIG. 13. The patch 30 may also be configured as a doubler 32 (FIG. 14) which may be overlaid on a composite structure 10 as shown in FIG. 14. Referring still to FIG. 17, step 216 may comprise removing the vacuum 66 (FIG. 12) from the suction holes 58 (FIG. 12) once the patch 30 is installed in the rework area 22 (FIG. 13). However, the vacuum may be continuously applied to the patch 30 until further operations such as vacuum bagging are initiated. In this regard, step 218 may comprise placing a bagging film 120 over the tool 50 such that the bagging film 120 seals the tool 50 including the patch 30 to the composite structure 10 in a manner as illustrated in FIG. 13. Step 220 may comprise drawing a vacuum on the bagging film 120 of the vacuum bag assembly 118 in order to provide substantially uniform pressure against the patch 30 by means of the caul plate 52. Step 222 may comprise heating the patch 30 (FIG. 13) in order to initiate partial or full curing thereof. In addition, the application of heat and/or pressure may facilitate curing of adhesive 26 (FIG. 13) installed between the bondline between the patch 30 and the rework area 22 (FIG. 13).

The method may optionally include removing the patch 30 (FIG. 13) when partially cured. In this regard, the prior step may include installing a parting film 116 (FIG. 13) between the patch 30 and rework area 22 (FIG. 13) prior to installing the patch 30 to prevent bonding of the patch 30 to the rework area 22. The parting film 116 (FIG. 13) may comprise any suitable material to prevent adhesive 26 bonding between the patch 30 and rework area 22. The patch 30 may be heated under pressure such as in an autoclave in order to fully cure the patch 30 (FIG. 13) after which the patch 30 may be reinstalled in the rework area 22. In this regard, the tool 50 (FIG. 12) may facilitate the transfer of the patch 30 from the autoclave to the rework area 22 (FIG. 13). The tool 50 may remain installed over the patch 30 in the rework area 22 wherein the vacuum bag assembly 118 (FIG. 13) may again be applied over the tool 50 with the patch 30 installed within the rework area 22 such that the caul plate 52 (FIG. 13) provides pressure to the patch 30 during final curing of the adhesive 26 to bond the patch 30 to the rework area 22.

Figure 18:
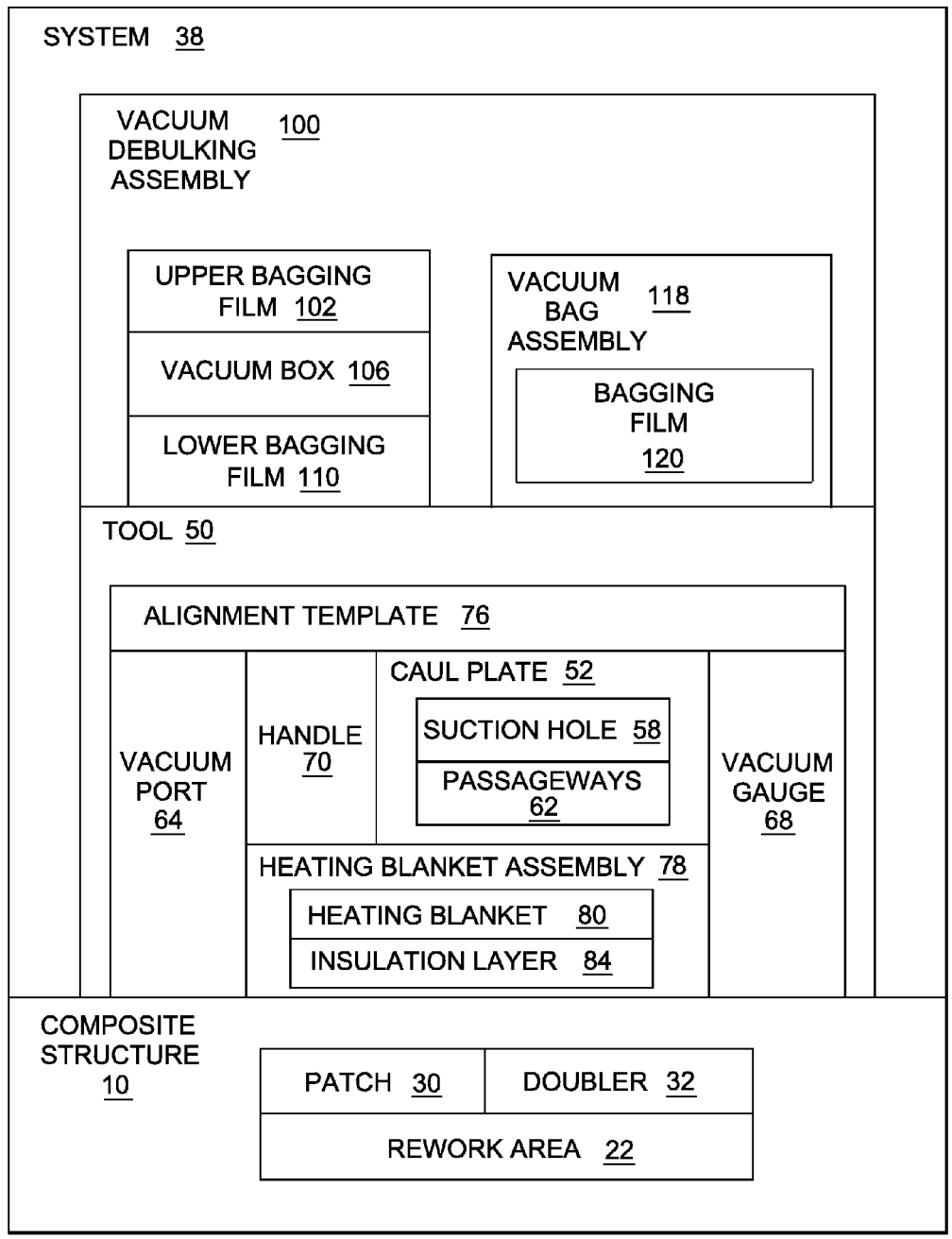
FIG. 18 is a block diagram illustrating a system including the tool.

Referring to FIG. 18, shown is a block diagram of a system 38 as may be used with the tool 50 described above such as for installing a patch 30 or doubler 32 on a rework area 22 of a composite structure 10. The tool 50 may include the caul plate 52 and, optionally, a heating blanket assembly 78 having a heating blanket 80 and an insulation layer 84 mounted to the caul plate 52. The caul plate 52 may include a plurality of suction holes 58 which may be fluidly coupled by passageways 62 to one another and/or to one or more vacuum ports 64 and vacuum gauge 68. The caul plate 52 may include one or more handles 70. The system 38 may further include a vacuum bag assembly 118 such as may be used in a debulking operation performed on the patch 30 or doubler 32.

As can be seen in FIG. 18, the vacuum bag assembly 118 may include a bagging film 120 which may seal the tool 50 and patch 30 or doubler 32 to the rework area 22. The system 38 may optionally include a vacuum debulking assembly 100 which may be sealed to the caul plate 52 for debulking the patch 30 or doubler 32. The vacuum debulking assembly 100 may include a lower bagging film 110 for sealing the patch 30 to the caul plate 52 and a vacuum box 106 mountable over the lower bagging film 110 and covering the patch 30 or doubler 32. The vacuum debulking assembly 100 may further include an upper bagging film 102 that may be extended over the vacuum box 106 for sealing the vacuum box 106 to the lower bagging film 110.

Figure 19:
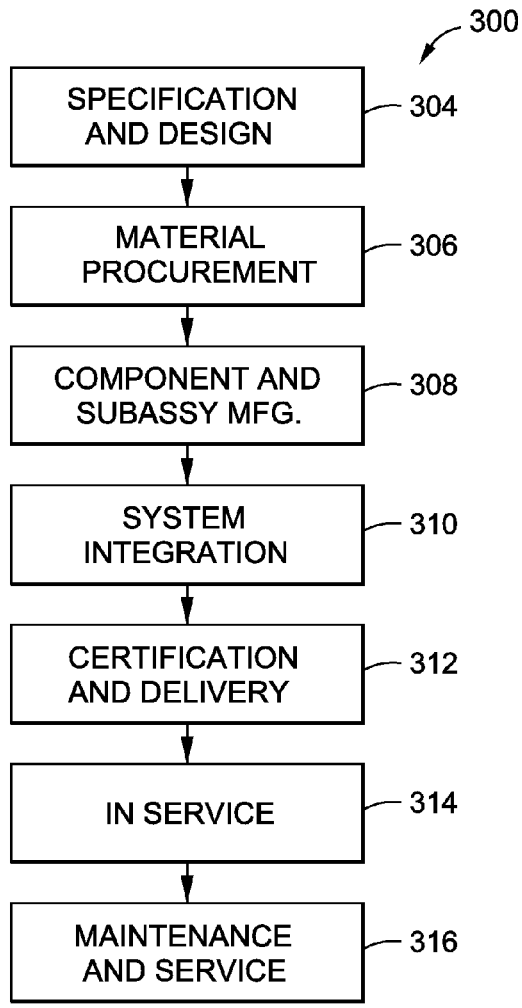
FIG. 19 is a flow diagram of an aircraft production and service methodology.
Figure 20:
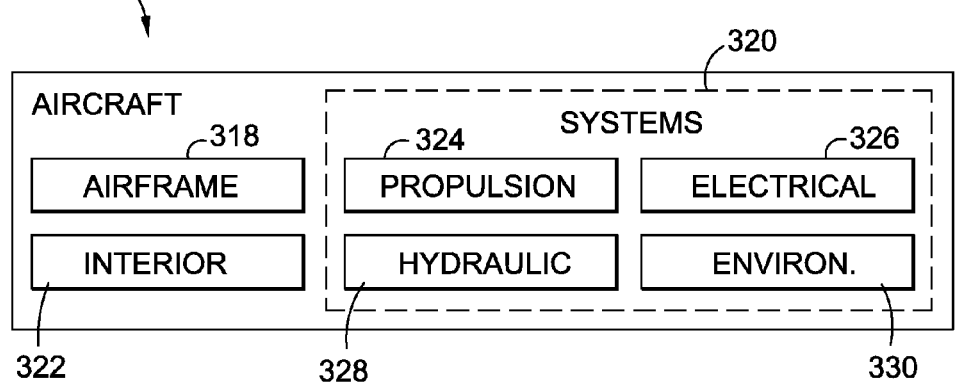
FIG. 20 is a block diagram of an aircraft.

Referring to FIGS. 19-20, embodiments of the disclosure may be described in the context of an aircraft manufacturing and service method 300 as shown in FIG. 19 and an aircraft 302 as shown in FIG. 20. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of processing a patch, comprising the steps of:
mounting the patch on an upper surface of a caul plate having a lower surface, at least one suction hole, and a vacuum port fluidly coupled to the suction hole by an internal passageway extending generally parallel to the upper and lower surfaces in non-contacting relation thereto;
drawing a vacuum on the vacuum port through the internal passageway and the suction hole to maintain the patch in contact with the caul plate.

2. The method of claim 1 further comprising the step of:
consolidating the patch using a vacuum debulking assembly sealed to the caul plate.

3. The method of claim 1 further comprising the steps of:
transferring the caul plate and patch to a rework area;
placing a bagging film over the caul plate and patch such that the bagging film is sealed to the rework area; and
drawing a vacuum on the bagging film.

4. The method of claim 3 further comprising the steps of:
at least partially curing the patch in the rework area; and
applying at least one of heat and pressure to the patch.

5. The method of claim 4 wherein the step of at least partially curing the patch comprises:
applying heat to the patch with a heating blanket coupled to the caul plate.

6. The method of claim 3 further comprising the step of:
insulating the patch thermally when transferring the patch to the rework area.

7. A method of processing a patch, comprising the steps of:
mounting the patch on an upper surface of a caul plate having a lower surface, a plurality of suction holes, and a vacuum port fluidly coupled to the suction holes by one or more internal passageways extending generally parallel to the upper and lower surfaces in non-contacting relation thereto;
consolidating the patch using a vacuum debulking assembly sealed to the caul plate;
drawing a vacuum on the vacuum port through the internal passageways and at the suction holes to maintain the patch in contact with the caul plate;
transferring the patch to a rework area using the caul plate;
insulating the patch thermally;
applying heat to the patch;
removing the vacuum from the suction holes;
placing a bagging film over the caul plate and patch such that the bagging film is sealed to the rework area;
drawing a vacuum on the bagging film; and
applying heat to the patch to at least partially cure the patch.

* * * * *